US012231262B2

United States Patent
Mathew et al.

(10) Patent No.: US 12,231,262 B2
(45) Date of Patent: Feb. 18, 2025

(54) VIRTUAL TUNNEL ENDPOINT (VTEP) MAPPING FOR OVERLAY NETWORKING

(71) Applicant: VMware, Inc., Palo Alto, CA (US)

(72) Inventors: Subin Cyriac Mathew, Santa Clara, CA (US); Chidambareswaran Raman, Campbell, CA (US); Prerit Rodney, Cupertino, CA (US); Naveen Vijayan Kodakkal Puthiyaveettil, Mountain View, CA (US)

(73) Assignee: VMware LLC, Palo Alto, CA (US)

( * ) Notice: Subject to any disclaimer, the term of this patent is extended or adjusted under 35 U.S.C. 154(b) by 369 days.

(21) Appl. No.: 17/560,284

(22) Filed: Dec. 23, 2021

(65) Prior Publication Data

US 2023/0208678 A1 Jun. 29, 2023

(51) Int. Cl.
*H04L 29/12* (2006.01)
*H04L 12/46* (2006.01)
*H04L 43/0876* (2022.01)

(52) U.S. Cl.
CPC ...... *H04L 12/4633* (2013.01); *H04L 43/0876* (2013.01)

(58) Field of Classification Search
None
See application file for complete search history.

(56) References Cited

U.S. PATENT DOCUMENTS

| | | | |
|---|---|---|---|
| 9,882,741 B2* | 1/2018 | Nomi | H04L 47/805 |
| 10,158,502 B2* | 12/2018 | Yoshino | H04L 45/74 |
| 10,374,878 B2* | 8/2019 | Yadav | H04L 41/12 |
| 10,917,262 B2* | 2/2021 | Gao | H04L 12/4675 |
| 10,931,629 B2* | 2/2021 | Chander | H04L 12/4633 |
| 10,999,196 B2* | 5/2021 | Wan | H04L 49/10 |
| 11,271,776 B2* | 3/2022 | Nagaraj | H04L 43/20 |
| 2017/0163598 A1* | 6/2017 | Shen | H04L 45/74 |
| 2020/0021483 A1* | 1/2020 | Boutros | H04L 45/16 |
| 2022/0210006 A1* | 6/2022 | Carrington-Fair | H04L 41/0661 |

* cited by examiner

*Primary Examiner* — Sithu Ko
(74) *Attorney, Agent, or Firm* — King Intellectual Asset Management

(57) ABSTRACT

Example methods and systems for virtual tunnel endpoint (VTEP) mapping for overlay networking are described. One example may involve a computer system monitoring multiple VTEPs that are configured for overlay networking. In response to detecting a state transition associated with a first VTEP from a healthy state to an unhealthy state, the computer system may identify mapping information that associates a virtualized computing instance with the first VTEP in the unhealthy state; and update the mapping information to associate the virtualized computing instance with a second VTEP in the healthy state. In response to detecting an egress packet from the virtualized computing instance to a destination, an encapsulated packet may be generated and sent towards the destination based on the updated mapping information. The encapsulated packet may include the egress packet and an outer header identifying the second VTEP to be a source VTEP.

21 Claims, 8 Drawing Sheets

VIRTUAL TUNNEL ENDPOINT (VTEP) MAPPING FOR OVERLAY NETWORKING

BACKGROUND

Virtualization allows the abstraction and pooling of hardware resources to support virtual machines in a software-defined data center (SDDC). For example, through server virtualization, virtualized computing instances such as virtual machines (VMs) running different operating systems may be supported by the same physical machine (e.g., referred to as a "computer system" or "host"). Each VM is generally provisioned with virtual resources to run a guest operating system and applications. The virtual resources may include central processing unit (CPU) resources, memory resources, storage resources, network resources, etc. In practice, multiple virtual tunnel endpoints (VTEPs) may be configured on a computer system. The VTEPs may be susceptible to various performance issues that affect the performance of overlay networking in the SDN environment.

DETAILED DESCRIPTION

Figure 1:
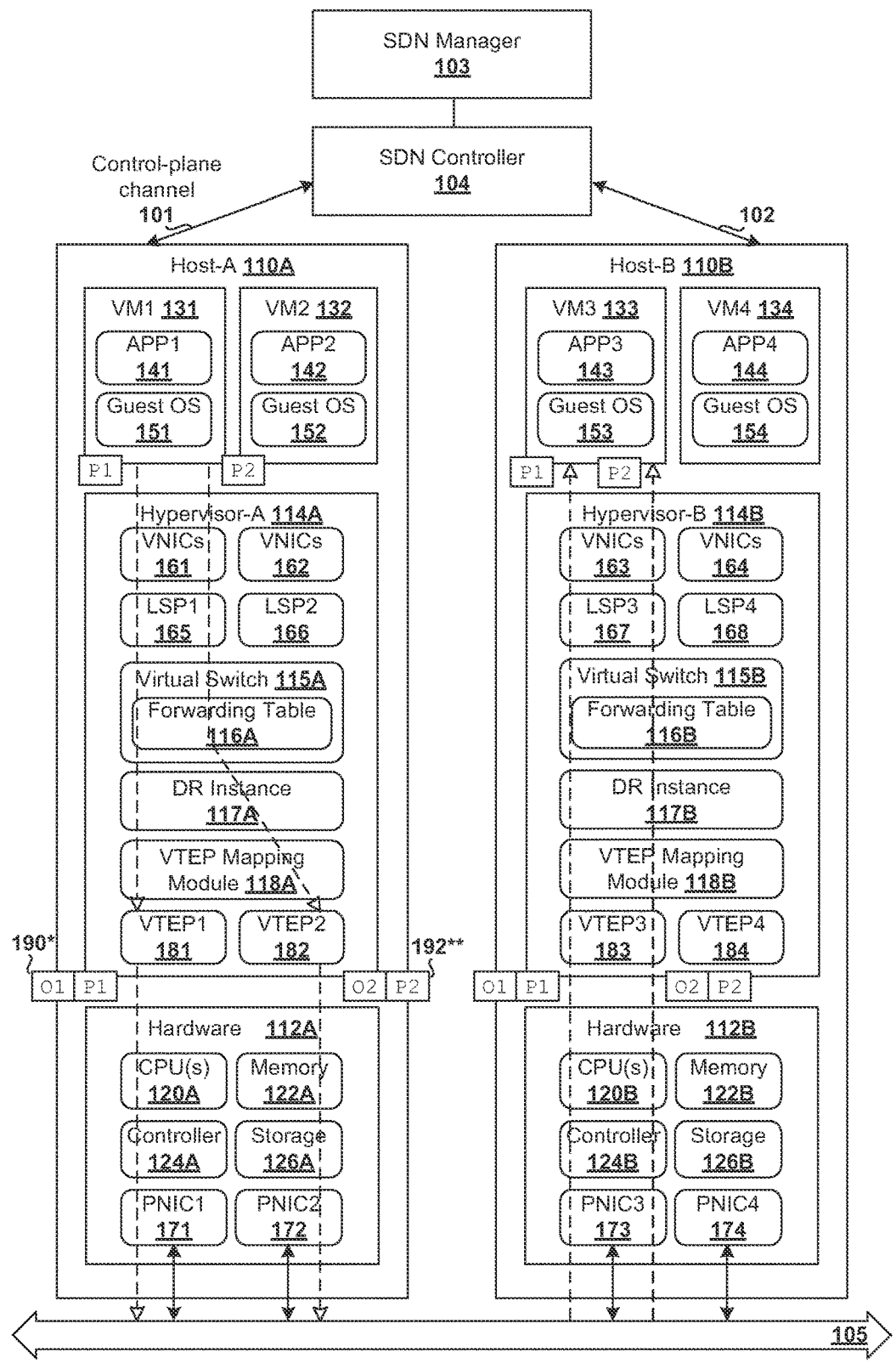
FIG. 1 is a schematic diagram illustrating an example software-defined networking (SDN) environment in which virtual tunnel endpoint (VTEP) mapping for overlay networking may be performed.

According to examples of the present disclosure, overlay networking may be implemented in an improved manner by dynamically mapping virtual tunnel endpoints (VTEPs) and virtualized computing instances (e.g., virtual machines). One example may involve a computer system (e.g., host-A 110A in FIG. 1) monitoring multiple VTEPs that are configured on the computer system for overlay networking, including a first VTEP (e.g., VTEP1 181) and a second VTEP (e.g., VTEP2 182). In response to detecting a state transition associated with the first VTEP from a HEALTHY state to an UNHEALTHY state, the computer system may identify mapping information that associates a virtualized computing instance (e.g., VM1 131) with the first VTEP. Also, the mapping information may be updated to associate the virtualized computing instance with the second VTEP, thereby migrating the virtualized computing instance from the first VTEP (i.e., UNHEALTHY) to the second VTEP (i.e., HEALTHY).

In response to detecting an egress packet from the virtualized computing instance to a destination, an encapsulated packet (e.g., 192 in FIG. 1) may be generated and sent towards the destination based on the updated mapping information. The encapsulated packet may include the egress packet and an outer header identifying the second VTEP to be a source VTEP. As will be described below, mapping information may be updated dynamically and automatically to facilitate high-availability overlay networking, reduce system downtime, and improve data center user experience.

In the following detailed description, reference is made to the accompanying drawings, which form a part hereof. In the drawings, similar symbols typically identify similar components, unless context dictates otherwise. The illustrative embodiments described in the detailed description, drawings, and claims are not meant to be limiting. Other embodiments may be utilized, and other changes may be made, without departing from the spirit or scope of the subject matter presented here. It will be readily understood that the aspects of the present disclosure, as generally described herein, and illustrated in the drawings, can be arranged, substituted, combined, and designed in a wide variety of different configurations, all of which are explicitly contemplated herein.

Challenges relating to overlay networking will now be explained in more detail using FIG. 1, which is a schematic diagram illustrating example software-defined networking (SDN) environment 100 in which VTEP mapping for overlay networking may be performed. It should be understood that, depending on the desired implementation, SDN environment 100 may include additional and/or alternative components than that shown in FIG. 1. Although the terms "first" and "second" are used to describe various elements, these elements should not be limited by these terms. These terms are used to distinguish one element from another. For example, a first element may be referred to as a second element, and vice versa.

SDN environment 100 includes multiple hosts 110A-B that are inter-connected via physical network 105. Each host 110A/110B may include suitable hardware 112A/112B and virtualization software (e.g., hypervisor-A 114A, hypervisor-B 114B) to support various virtual machines (VMs). For example, hosts 110A-B may support respective VMs 131-134. Hardware 112A/112B includes suitable physical components, such as central processing unit(s) or processor(s) 120A/120B; memory 122A/122B; physical network interface controllers (PNICs) 171-174; and storage 126A/126B, etc. In practice, SDN environment 100 may include any number of hosts (also known as "host computers", "host devices", "physical servers", "server systems", "transport nodes," etc.). Each host may be supporting tens or hundreds of VMs.

Hypervisor 114A/114B maintains a mapping between underlying hardware 112A/112B and virtual resources allocated to respective VMs. Virtual resources are allocated to respective VMs 131-134 to support a guest operating system (OS; not shown for simplicity) and application(s) 141-144. For example, the virtual resources may include virtual CPU, guest physical memory, virtual disk, virtual network interface controller (VNIC), etc. Hardware resources may be emulated using virtual machine monitors (VMMs). For example in FIG. 1, VNICs 161-164 are virtual network adapters for VMs 131-134, respectively, and are emulated by corresponding VMMs (not shown for simplicity) instantiated by their respective hypervisor at respective host-A 110A and host-B 110B. The VMMs may be considered as part of respective VMs, or alternatively, separated from the VMs. Although one-to-one relationships are shown, one VM may be associated with multiple VNICs (each VNIC having its own network address).

Although examples of the present disclosure refer to VMs, it should be understood that a "virtual machine" running on a host is merely one example of a "virtualized computing instance" or "workload." A virtualized computing instance may represent an addressable data compute node (DCN) or isolated user space instance. In practice, any suitable technology may be used to provide isolated user space instances, not just hardware virtualization. Other virtualized computing instances may include containers (e.g., running within a VM or on top of a host operating system without the need for a hypervisor or separate operating system or implemented as an operating system level virtualization), virtual private servers, client computers, etc. Such container technology is available from, among others, Docker, Inc. The VMs may also be complete computational environments, containing virtual equivalents of the hardware and software components of a physical computing system.

The term "hypervisor" may refer generally to a software layer or component that supports the execution of multiple virtualized computing instances, including system-level software in guest VMs that supports namespace containers such as Docker, etc. Hypervisors 114A-B may each implement any suitable virtualization technology, such as VMware ESX® or ESXi™ (available from VMware, Inc.), Kernel-based Virtual Machine (KVM), etc. The term "packet" may refer generally to a group of bits that can be transported together, and may be in another form, such as "frame," "message," "segment," etc. The term "traffic" or "flow" may refer generally to multiple packets. The term "layer-2" may refer generally to a link layer or media access control (MAC) layer; "layer-3" to a network or Internet Protocol (IP) layer; and "layer-4" to a transport layer (e.g., using Transmission Control Protocol (TCP), User Datagram Protocol (UDP), etc.), in the Open System Interconnection (OSI) model, although the concepts described herein may be used with other networking models.

Hypervisor 114A/114B implements virtual switch 115A/115B and logical distributed router (DR) instance 117A/117B to handle egress packets from, and ingress packets to, corresponding VMs. In SDN environment 100, logical switches and logical DRs may be implemented in a distributed manner and can span multiple hosts. For example, logical switches that provide logical layer-2 connectivity, i.e., an overlay network, may be implemented collectively by virtual switches 115A-B and represented internally using forwarding tables 116A-B at respective virtual switches 115A-B. Forwarding tables 116A-B may each include entries that collectively implement the respective logical switches. Further, logical DRs that provide logical layer-3 connectivity may be implemented collectively by DR instances 117A-B and represented internally using routing tables (not shown) at respective DR instances 117A-B. The routing tables may each include entries that collectively implement the respective logical DRs.

Packets may be received from, or sent to, each VM via an associated logical port. For example, logical switch ports 165-168 (labelled "LSP1" to "LSP4") are associated with respective VMs 131-134. Here, the term "logical port" or "logical switch port" may refer generally to a port on a logical switch to which a virtualized computing instance is connected. A "logical switch" may refer generally to a software-defined networking (SDN) construct that is collectively implemented by virtual switches 115A-B in FIG. 1, whereas a "virtual switch" may refer generally to a software switch or software implementation of a physical switch. In practice, there is usually a one-to-one mapping between a logical port on a logical switch and a virtual port on virtual switch 115A/115B. However, the mapping may change in some scenarios, such as when the logical port is mapped to a different virtual port on a different virtual switch after migration of the corresponding virtualized computing instance (e.g., when the source host and destination host do not have a distributed virtual switch spanning them).

Through virtualization of networking services in SDN environment 100, logical networks (also referred to as overlay networks or logical overlay networks) may be provisioned, changed, stored, deleted, and restored programmatically without having to reconfigure the underlying physical hardware architecture. SDN controller 103 and SDN manager 104 are example network management entities in SDN environment 100. One example of an SDN controller is the NSX controller component of VMware NSX® (available from VMware, Inc.) that operates on a central control plane (CCP). SDN controller 103 may be a member of a controller cluster (not shown for simplicity) that is configurable using SDN manager 104 operating on a management plane. Network management entity 103/104 may be implemented using physical machine(s), VM(s), or both. Logical switches, logical routers, and logical overlay networks may be configured using SDN controller 103, SDN manager 104, etc. To send or receive control information, a local control plane (LCP) agent (not shown) on host 110A/110B may interact with SDN controller 103 via control-plane channel 101/102.

Overlay Networking

Advances relating to SDN with overlay networking in the last decade has enabled relatively quick and easy deployment and management of substantially large-scale data centers, usually called Software Defined Data Centers (SDDCs). The scale of these SDDCs has been increasing rapidly, such as towards hundreds of hypervisors that are each capable of hosting hundreds of VMs. In general, overlay networking stretches a layer-2 network over an underlying layer-3 network. Any suitable overlay networking protocol(s) may be implemented, such as Virtual eXtensible Local Area Network (VXLAN), Stateless Transport Tunneling (STT), Generic Network Virtualization Encapsulation (GENEVE), Generic Routing Encapsulation (GRE), etc.

In practice, overlay networking protocols require overlay traffic from VMs to be encapsulated with an outer header with source and destination VTEPs. For example in FIG. 1, hypervisor 114A/114B may implement multiple VTEPs to encapsulate and decapsulate packets with an outer header (also known as a tunnel header) identifying a logical overlay network. In particular, hypervisor-A 114A at host-A 110A implements VTEP1 181 and VTEP2 182, while hypervisor-B 114B at host-B 110B implements VTEP3 183 and VTEP4 184. Encapsulated packets may be sent via a logical overlay tunnel established between a pair of VTEPs over physical network 105, over which respective hosts 110A-B are in layer-3 connectivity with one another. In other words, the logical overlay tunnel terminates at the VTEPs.

Figure 2:
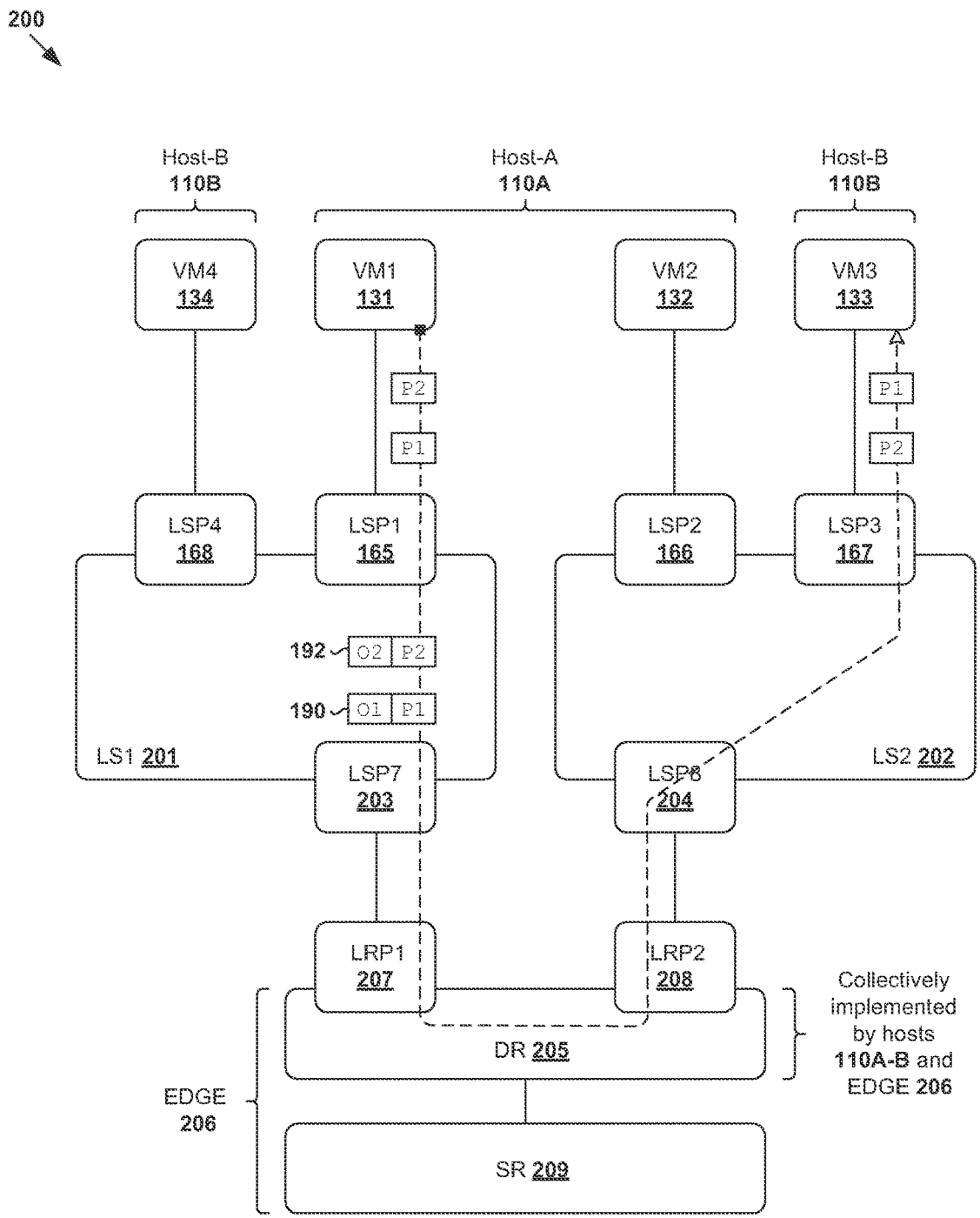
FIG. 2 is a schematic diagram illustrating an example management plane view of the SDN environment in FIG. 1.

Some example logical overlay networks are shown in FIG. 2, which is a schematic diagram illustrating example management plane view 200 of SDN environment 100 in FIG. 1. Here, VM1 131 and VM4 134 are located on a first logical layer-2 segment associated with virtual network identifier (VNI)=5000 and connected to a first logical switch (see "LS1" 201). VM2 132 and VM3 133 are located on a second logical layer-2 segment associated with VNI=6000 and connected to a second logical switch (see "LS2" 202). With the growth of infrastructure-as-a-service (IaaS), logical overlay networks may be deployed to support multiple tenants. In this case, each logical overlay network may be designed to be an abstract representation of a tenant's network in SDN environment 100. Depending on the desired implementation, a multi-tier topology may be used to isolate multiple tenants.

A logical DR (see "DR" 205) connects logical switches 201-202 to facilitate communication among VMs 131-134 on different segments. See also logical switch ports "LSP7" 203 and "LSP8" 204, and logical router ports "LRP1" 207 and "LRP2" 208 connecting DR 205 with logical switches 201-202. Logical switch 201/202 may be implemented collectively by multiple hosts 110A-B, such as using virtual switches 115A-B and represented internally using forwarding tables 116A-B. DR 205 may be implemented collectively by multiple transport nodes, such as using edge node 206 and hosts 110A-B. For example, DR 205 may be implemented using DR instances 117A-B and represented internally using routing tables (not shown) at respective hosts 110A-B.

Edge node 206 (labelled "EDGE") may implement one or more logical DRs and logical service routers (SRs), such as DR 205 and SR 209 in FIG. 2. SR 209 may represent a centralized routing component that provides centralized stateful services to VMs 131-134, such as IP address assignment using dynamic host configuration protocol (DHCP), network address translation (NAT), etc. EDGE 206 may be implemented using VM(s) and/or physical machines ("bare metal machines"), and capable of performing functionalities of a switch, router (e.g., logical service router), bridge, gateway, edge appliance, or any combination thereof. In practice, EDGE 206 may be deployed at the edge of a geographical site to facilitate north-south traffic to an external network, such as another data center at a different geographical site.

One of the challenges in SDN environment 100 is to maintain the availability of overlay networking to support packet forwarding to/from VMs 131-134. These workloads require network connectivity to support various applications, such as web servers, databases, proxies, network functions, etc. However, with the increased use of overlay networking protocols, the complexity of SDN environment 100 also increases, which inevitably introduces more possible failure points. For example in FIG. 1, multiple VTEPs 181-182 may be configured on host-A 110A for overlay networking. Conventionally, VM(s) may be mapped to VTEP 181/182 that is responsible for packet encapsulation and decapsulation for the VM(s). When VTEP 181/182 fails, however, overlay networking connectivity for the VM(s) will be lost. This is especially problematic there is a large number (e.g., several hundreds) of VMs that are mapped to particular VTEP 181/182.

VTEP Mapping for Overlay Networking

Figure 3:
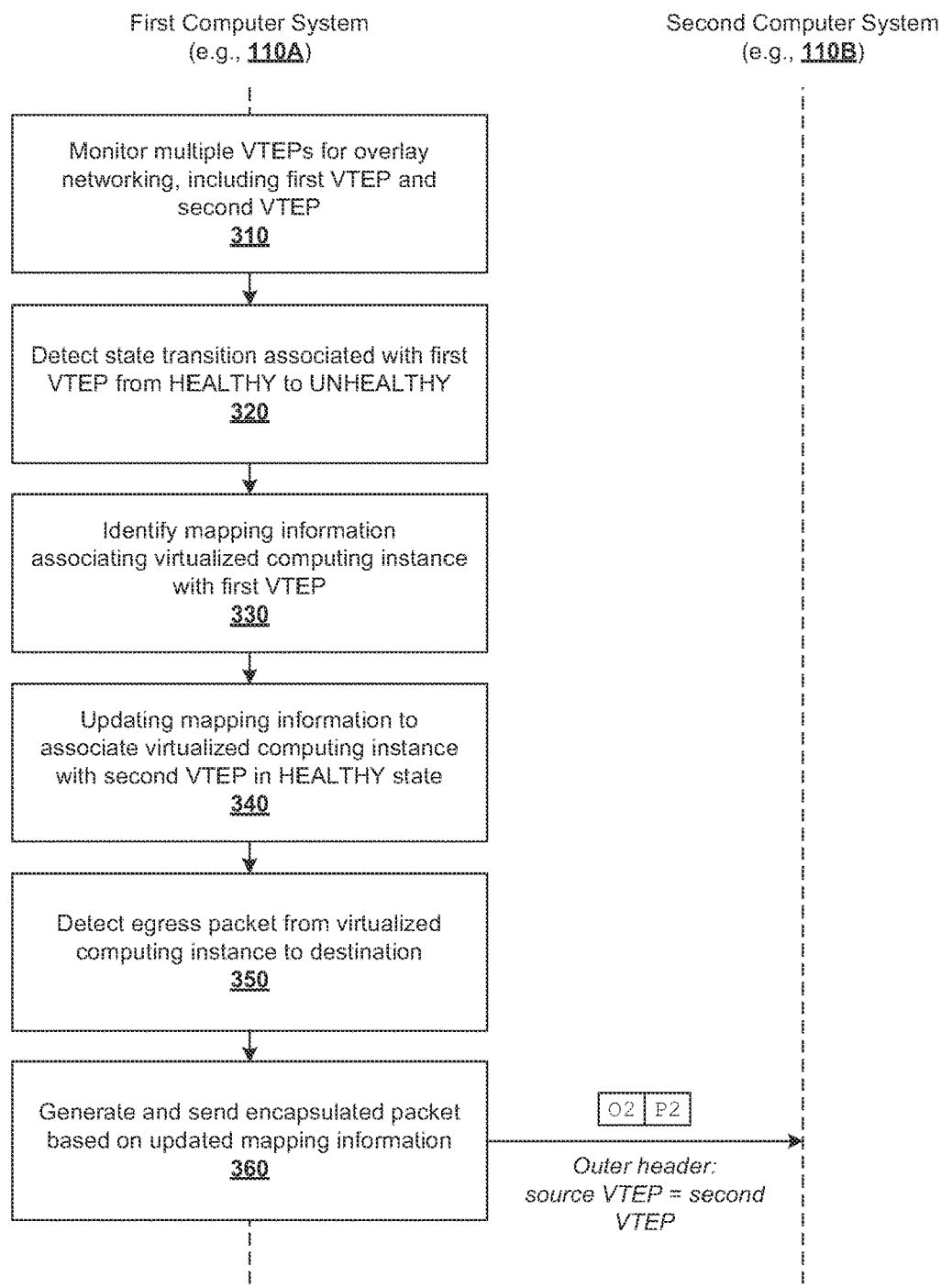
FIG. 3 is a flowchart of an example process for a computer system for VTEP mapping for overlay networking in an SDN environment.

According to examples of the present disclosure, the health of VTEPs 181-184 may be monitored and VM-VTEP mapping information updated dynamically and automatically on host 110A/110B to facilitate high-availability overlay networking. In more detail, FIG. 3 is a flowchart of example process 300 for a computer system to perform VTEP mapping for overlay networking in SDN environment 100. Example process 300 may include one or more operations, functions, or actions illustrated by one or more blocks, such as 310 to 360. The various blocks may be combined into fewer blocks, divided into additional blocks, and/or eliminated depending on the desired implementation. In the following, various examples will be explained using host 110A as an example "computer system" and VM1 131 as an example "virtualized computing instance."

At 310 in FIG. 3, host-A 110A may monitor multiple VTEPs that are configured on host-A 110A for overlay networking, including first VTEP1 181 and second VTEP2 182. At 320, 330 and 340, in response to detecting a state transition associated with first VTEP 181 from a HEALTHY state to an UNHEALTHY state, host-A 110A may identify mapping information that associates VM1 131 with first VTEP1 181 and update the mapping information to associate VM1 131 with second VTEP2 182 instead. This has the effect of migrating VM1 131 from first VTEP1 181 in the UNHEALTHY state to second VTEP2 182 in the HEALTHY state.

At 350 and 360 in FIG. 3, in response to detecting an egress packet VM1 131 to a destination, host-A 110A may generate and send an encapsulated packet towards the destination based on the updated mapping information. In this case, the encapsulated packet includes the egress packet and an outer header identifying the second VTEP2 182 to be a source VTEP.

For example in FIGS. 1-2, first encapsulated packet (see 190) may be generated and sent based on mapping information=(VM1 131, VTEP1 181). In this case, first encapsulated packet 190 may include an outer header (O1) identifying source VTEP=VTEP1 181. In response to detecting a state transition from the HEALTHY state to the UNHEALHTY state, the mapping information may be updated to (VM1 131, VTEP2 182). Based on the updated mapping information, second encapsulated packet (see 192 in FIGS. 1-2) may be generated and sent towards destination VTEP3 183 on host-B 110B. Second encapsulated packet 192 may include an outer header (O2) identifying source VTEP=VTEP2 182 instead of VTEP1 181.

Depending on the desired implementation, initial mapping=(VM1 131, VTEP1 181) may be configured once VM1 131 is created or connected to a network based on any suitable teaming policy, such as load balancing based on a configuration parameter (e.g., VNIC Port ID, MAC address) associated with VM1 131 and a failover order associated with multiple VTEPs 181-182. The initial mapping=(VM1, VTEP1) may be restored once connectivity via first VTEP 181 has recovered. For example, in response to detecting a subsequent state transition associated with first VTEP1 181 from the UNHEALTHY state to the HEALTHY state, host-A 110A may update the mapping information to reassociate VM1 131 with VTEP1 181. This has the effect of migrating VM1 131 from second VTEP2 182 to first VTEP1 181, both being in the HEALTHY state. This way, overlay networking traffic may be load balanced among VTEPs 181-182 on host-A 110A.

As will be described further below, VTEP 181/182 may transition between a HEALTHY state and an UNHEALHTY state according to a state machine in FIG. 6. In a first example, block 320 may involve detecting the state transition to a first UNHEALTHY state (e.g., IP_WAITING in FIG. 6) in which first VTEP 181 has not been assigned with a valid IP address by a Dynamic Host Configuration Protocol (DHCP) server, or the lease of the IP address has expired. In a second example, first VTEP 181 may transition to a second UNHEALTHY state (e.g., BFD_DOWN in FIG. 6) in which each and every overlay networking path via first VTEP1 181 is down. In a third example, first VTEP 181 may transition to a third UNHEALTHY state (e.g., ADMIN_D-

Figure 6:
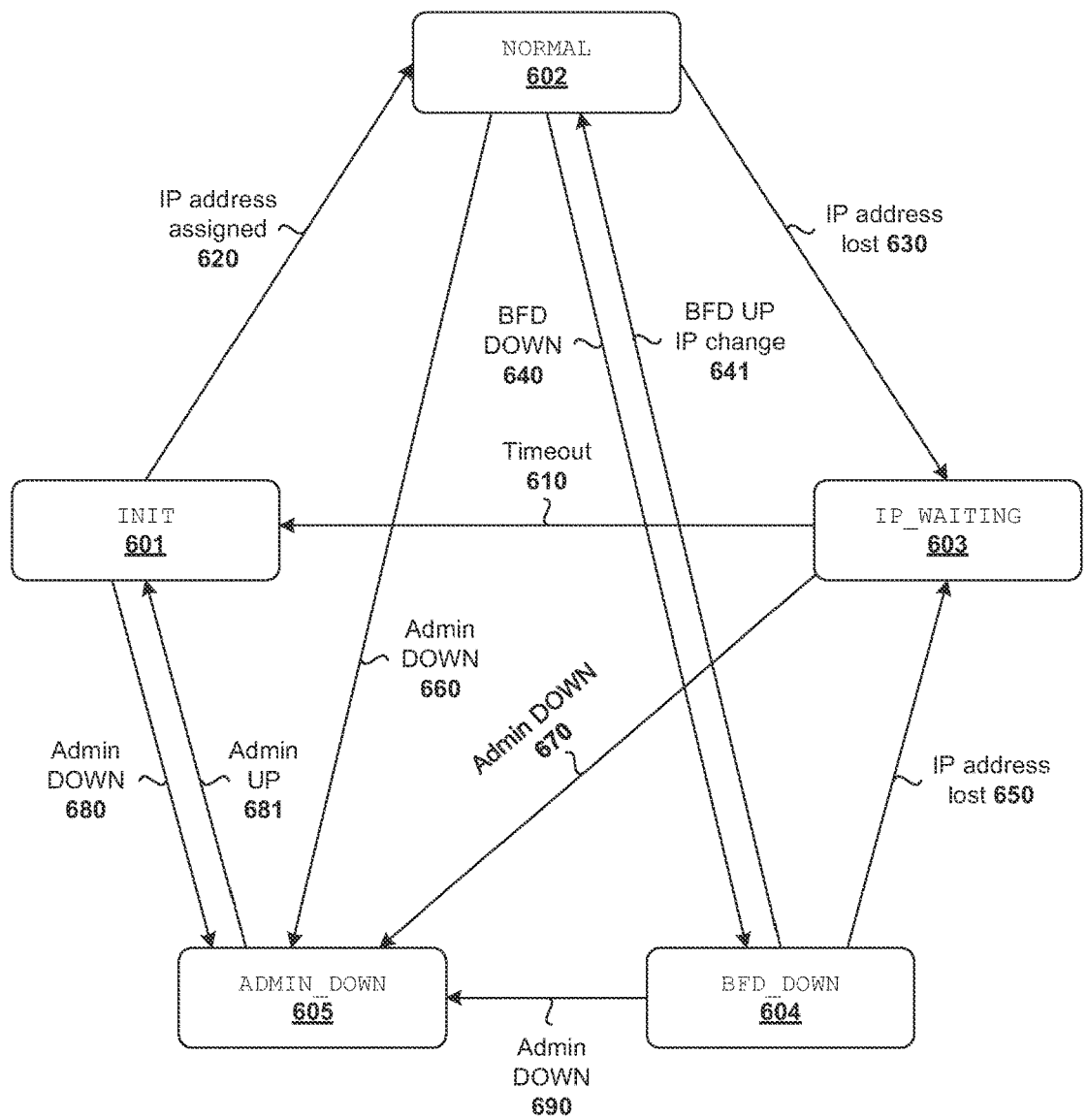
FIG. 6 is a schematic diagram illustrating an example VTEP state machine.

OWN in FIG. 6) that is configured by a network administrator, such as for maintenance and troubleshooting purposes.

Examples of the present disclosure should be contrasted against conventional approaches that rely on static VM-VTEP mapping. In this case, when there is a failure affecting a VTEP, VMs mapped to the VTEP will be affected because all overlay traffic will be dropped. The loss of overlay networking connectivity is especially problematic for VMs are running critical workloads and/or when a large number of VMs (e.g., order of hundreds) are mapped to the VTEP. In some cases, a network administrator may have to intervene and restore connectivity, which is time consuming and inefficient. As will be described further below, connectivity loss and the need for manual intervention may be reduced using examples of the present disclosure. In enterprises and cloud operations, any improvement in the availability of overlay networking is important because every second of downtime may lead to huge losses and degraded user experience.

VTEP Configuration and Mapping

Figure 4:
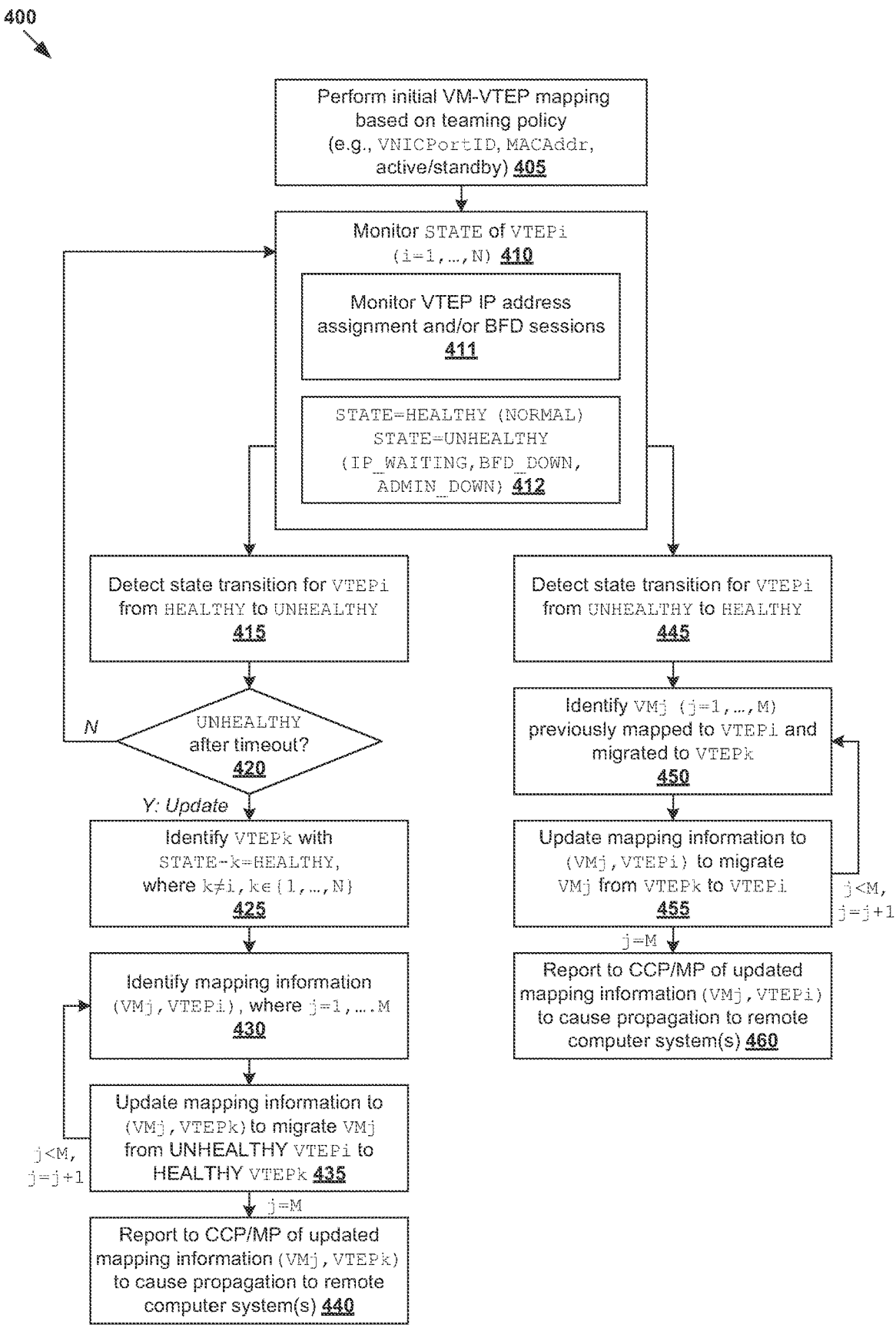
FIG. 4 is a flowchart of an example detailed process for a computer system for VTEP mapping for overlay networking in an SDN environment.

FIG. 4 is a flowchart of example detailed process 400 for VTEP mapping for overlay networking in SDN environment 100. Example process 400 may include one or more operations, functions, or actions illustrated at 410 to 460. The various operations, functions or actions may be combined into fewer blocks, divided into additional blocks, and/or eliminated depending on the desired implementation. The example in FIG. 4 will be explained using FIG. 5, which is a schematic diagram illustrating example 500 of VTEP mapping for overlay networking.

Examples of the present disclosure may be implemented any suitable software and/or hardware component(s) that will be collectively represented using VTEP mapping module 118A/118B in FIG. 1. Depending on the desired implementation, mapping module 118A/118B may include (1) an interface sub-module to check the IP address assignment, (2) a monitoring sub-module to manage monitoring sessions established between VTEPs, (3) remap up/down sub-module(s) to update mapping information dynamically, etc. In relation to overlay networking, the following notations will be used below: SIP=source IP address, DIP=destination IP address, OUTER_SIP=outer source VTEP IP address in an outer header, OUTER_DIP=outer destination VTEP IP address in the outer header, etc.

(a) Multi-VTEP Configuration

Figure 5:
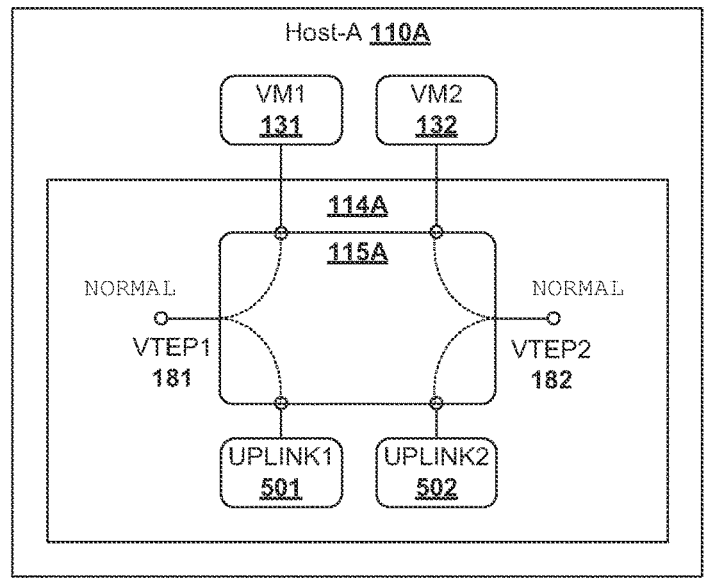
FIG. 5 is a schematic diagram illustrating a first example of VTEP mapping for overlay networking.
Figure 5:
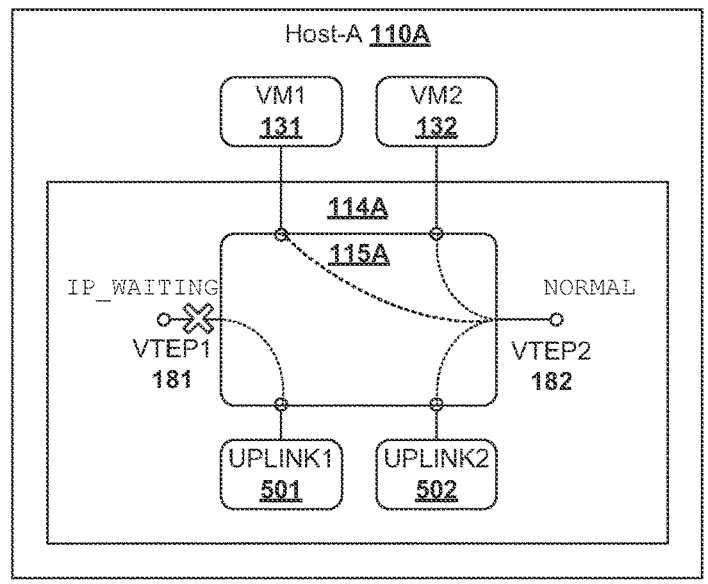

Referring first to FIG. 5, host-A 110A may be configured with multiple (N) VTEPs for overlay networking. Each VTEP may be denoted as VTEFi, where i=1, . . . , N. For the case N=2, VTEP1 181 and VTEP2 182 are configured for overlay networking on host-A 110A. In practice, VTEPs 181-182 may be created as ports on virtual switch 115A. Like any other interface, VTEP 181/182 requires an IP address and a MAC address. For example, VTEP1 181 may be associated with (IP address=IP-VTEP1, MAC address=MAC-VTEP1, VTEP label=VTEP1) and VTEP2 182 with (IP address=IP-VTEP2, MAC address=MAC-VTEP2, VTEP label=VTEP2). To connect to physical network 105, each VTEPi may be associated with an uplink (denoted as UPLINKi), such as UPLINK1 for VTEP1 181 and UPLINK2 for VTEP2 182. See 501-502 in FIG. 5.

As used herein, an "uplink" may represent a logical construct for a connection to a network. From the perspective of host 110A/B, the term "uplink" may refer generally to a network connection from host 110A/B via PNIC 171/172/173/174 to a physical network device (e.g., top-of-rack switch, spine switch, router) in physical network 105. The term "downlink," on the other hand, may refer to a connection from the physical network device to host 110A/B. In practice, the mapping between an uplink and a PNIC may be one-to-one (i.e., one PNIC per uplink). Alternatively, a NIC teaming policy may be implemented to map multiple PNICs to one uplink. The term "NIC teaming" may refer to the grouping of multiple PNICs into one logical NIC.

(b) VM-VTEP Mapping

Referring also to FIG. 4, at 405, host-A 110A may perform initial VM-VTEP mapping for VM1 131 and VM2 132. For example, when VM1 131 is created and connected to a network, host-A 110A may create a VNIC port on virtual switch 115A for VNIC 161 of VM1 131. Similarly, for VM2 132, a VNIC port may be created on virtual switch 115A for VNIC2 162. VM1 131 and VM2 132 are connected to the same virtual switch 115A via respective VNIC ports.

To be mappable to different VTEPs, each VM may be configured with multiple VNICs. Each VNIC may be associated with a single VTEP for overlay networking. The one-to-one mapping is to reduce the risk of, if not prevent, MAC flaps on remote hosts. For example, VM1 131 may be allocated with multiple VNICs (collectively represented as 161 in FIG. 1), including a first VNIC that is mappable to VTEP1 181 and a second VNIC mappable to VTEP2 182 via virtual switch 115A. Similar configuration may be made for VM2 132 on host-A 110A, as well as VM3 133 and VM4 134 on host-B 110B.

Next, a VTEP may be selected for VM 131/132 based on any suitable teaming policy. In the example in FIG. 5, VM1 131 is mapped to VTEP1 181 (see 510), and VM2 132 to VTEP2 182 (see 520). Once determined, the VM-VTEP mapping or association may not change unless there is a change in the teaming policy, or a VTEP is added, removed, or marked as standby. Any suitable teaming policy may be used, such as load balancing based on a configuration parameter (e.g., VNIC port ID, VNIC MAC address) associated with VM 131/132, failover order associated with multiple VTEPs 181-182, etc. These example policies will be discussed below.

(1) In a first example, VTEP selection may be performed to achieve load balancing based on source VNIC port ID (denoted as VNICPortID) associated with VM 131/132. In this case, VTEP selection may involve determining modulo operation: endpointID=VNICPortID % N. Here, N=number of VTEPs and endpointID=unique ID assigned to a VTEP. For example, the modulo operation maps VM 131/132 to either endpointID=0 assigned to VTEP1 181 or endpointID=1 assigned to VTEP2 182.

(2) In a second example, VTEP selection may be performed to achieve load balancing based on source VNIC MAC address (MACAddr) associated with VM 131/132. In this case, VTEP selection may involve determining modulo operation: endpointID=MACAddr % N. Here, the sixth octet of the MAC address may be used instead of the VNIC port ID to map VM 131/132 to either VTEP1 181 or VTEP2 182.

(3) In a third example, VTEP selection may be performed based on a failover order associated with VTEPs 181-182. For example, host-A 110A may be configured with two active VTEPs 181-182, as well as a standby VTEP (not shown). Once an active VTEP fails, the standby VTEP may switch to the active mode and take over.

VTEP State Machine

At 410 in FIG. 4, host-A 110A may monitor VTEPs 181-182 configured for overlay networking. Each VTEPi may be associated with a health status or state (denoted as STATE-i) that is either HEALTHY or UNHEALTHY. For example, block 410 may involve monitoring whether VTEP 181/182 is assigned with a valid IP address by a DHCP server, or a lease for the IP address has expired. Additionally or alternatively, block 410 may involve monitoring a path (also known as a logical overlay tunnel) between local VTEP 181/182 on host-A 110A and remote VTEP 183/184 on host-B 110B. See also 411-412.

Any fault detection or continuity check protocol suitable for monitoring purposes may be used at block 411. One example is Bidirectional Forwarding Detection (BFD) protocol hat is defined in the Internet Engineering Task Force (IETF) Request for Comments (RFC) 5880, which is incorporated herein by reference. In overlay networking, BFD may be used between two VTEPs to detect failures in the underlay path between them. Using an asynchronous mode, for example, BFD packets may be generated and sent (e.g., using mapping module 118A/118B) over a BFD session periodically.

Some example HEALTHY and UNHEALTHY states will be discussed using FIG. 6, which is a schematic diagram illustrating example VTEP state machine 600. There are five states that a VTEP might be in: initialization state (see INIT 601), normal operational state (see NORMAL 602), awaiting IP address assignment state (see IP_WAITING 603), BFD session down state (see BFD_DOWN 604) and administrator-configured down state (see ADMIN_DOWN 605). When created, VTEP 181/182 will be in state=INIT 601.

VTEP 181/182 may be considered HEALTHY when operating in state=NORMAL 602. Otherwise, VTEP 181/182 may be considered UNHEALTHY when in IP_WAITING 603, BFD_DOWN 604 or ADMIN_DOWN 605. In this case, host-A 110A may detect the following state transitions:

At 610 in FIG. 6, a state transition to INIT 601 from IP_WAITING 603 (i.e., UNHEALTHY) may be detected when a valid IP address is not assigned to VTEP 181/182 within a predetermined period of time (i.e., timeout period). The IP address assignment might fail for various reasons, such as a DHCP server being unreachable or running out of IP addresses available for assignment (e.g., due to server expansion).

At 620 in FIG. 6, a state transition from INIT 601 to NORMAL 602 (i.e., HEALTHY) may be detected when a valid IP address is assigned to VTEP 181/182 and all its BFD sessions are up and running.

At 630 in FIG. 6, a state transition from NORMAL 602 to IP_WAITING 603 (i.e., UNHEALTHY) may be detected when an IP address assigned to VTEP 181/182 is lost. In practice, when an IP address is assigned by the DHCP server, the IP address is leased for a specific amount of time called DHCP lease time. The IP address may be lost when the lease is not renewed, such as when DHCP server is unreachable or has run out of IP addresses.

At 640 in FIG. 6, a state transition from NORMAL 602 to BFD_DOWN 604 (i.e., UNHEALTHY) may be detected when each and every overlay networking path and associated BFD session established using that VTEP 181/182 is down. For example, a full-mesh topology may be used to establish BFD sessions among VTEPs 181-184. At host-A 110A, for example, local VTEP1 181 may establish two BFD sessions with respective remote VTEP3 183 and VTEP4 184 on host-B 110B. The state transition occurs when each and every BFD session is down. At 641, a state transition from BFD_DOWN 604 to NORMAL 602 may occur when at least one BFD session is up, or there is an IP address change event. The IP address change may be detected when a new DHCP lease with a different IP address is given by a DHCP server during lease renewal, or an operator manually changes the VTEP IP address (e.g., using SDN manager 103). Note that if there is at least one of the BFD sessions is up and running, VTEP1 181 remains in NORMAL 602 and no state transition to BFD_DOWN 604 will occur.

At 650 in FIG. 6, a state transition from BFD_DOWN 604 to IP WAITING 603 (i.e., UNHEALTHY) may be detected when an IP address assigned to VTEP 181/182 is lost. Again, this may occur when the DHCP server becomes unreachable or has run out of IP addresses.

At 660, 670, 680 and 690 in FIG. 6, a state transition to ADMIN_DOWN 605 (i.e., UNHEALTHY) from INIT 601, NORMAL 602, IP_WAITING 603 or BFD_DOWN 604 may be detected. ADMIN_DOWN 605 represents a state that is configured by a network administrator to bring VTEP 181/182 down, such as for maintenance and troubleshooting purposes. At 681, a state transition from ADMIN_DOWN 605 to INIT 601 may occur when the network administrator performs configuration to bring VTEP 181/182 up and running again.

State Transitions (a) HEALTHY to UNHEALTHY

At 415-420 in FIG. 4, in response to detecting a state transition from HEALTHY to UNHEALTHY, host-A 110A may update a VM-VTEP mapping after a timeout period. In practice, block 415 may involve a notification system generating system notifications relating to state transitions, and a remap module listening to the notifications to detect any faulty VTEP. The timeout period may be user-configurable to avoid unnecessary remapping due to transient faults. Once the timeout period has elapsed, at 425, host-A 110A may identify a HEALTHY VTEPk where k≠i and i, k ∈ {1, . . . , N}. This way, at 430-435, each VM that is mapped to the UNHEALTHY VTEPi may be identified and migrated to the HEALTHY VTEPk.

In the example in FIG. 5, both VTEP1 181 and VTEP2 182 may be detected to be HEALTHY (e.g., NORMAL 602) at one point in time. In this case, host-A 110A may configure mapping information identifying first mapping=(VM1 131, VTEP1 181) and second mapping=(VM2 132, VTEP2 182) according to any suitable teaming policy. See 510-540 in FIG. 5.

After some time, however, host-A 110A may detect a state transition associated with VTEP1 181 from HEALTHY (e.g., NORMAL 602) to UNHEALTHY (e.g., IP_WAITING 603). Once the timeout period has elapsed, host-A 110A may identify VTEP2 182 to be in state=HEALTHY (e.g., NORMAL 602) and update the mapping information to associate VM1 131 with VTEP2 182. This has the effect of migrating VM1 131 from source=VTEP1 181 in the UNHEALTHY state to target=VTEP2 182 in the HEALTHY state. Since VTEP2 182 remains HEALTHY, the (VM2 132, VTEP2 182) mapping is not affected. See 550 (state transition), 560 (updated state) and 570 (updated mapping information) in FIG. 5.

At 440 in FIG. 4, once the VM-VTEP mapping is updated, host-A 110A may generate and send a report to inform SDN controller 104 of the updated mapping information, such as (VM1 131, VTEP2 182) in FIG. 5. The control information may be sent to cause SDN controller 104 to propagate the updated mapping information to remote hosts, including host-B 110B to facilitate packet forwarding towards VM1 131 using destination VTEP2 182 instead of VTEP1 181.

(b) UNHEALTHY to HEALTHY

At 445-455 in FIG. 4, in response to detecting a state transition from UNHEALTHY to HEALTHY, host-A 110A may restore a VM-VTEP mapping. In particular, at 450, in response to detecting that VTEPi has recovered, host-A 110A may identify VM(s) previously mapped to VTEPi and migrated to VTEPk. This way, at 455, host-A 110A may migrate the VM(s) from VTEPk to VTEPi for load balancing purposes. Further, at 460, a report may be generated and sent to inform SDN controller 104 and trigger propagation of the updated mapping to other hosts, including host-B 110B.

In the example in FIG. 5, host-A 110A may detect a state transition from UNHEALTHY (e.g., IP_WAITING 603) to HEALTHY (e.g., NORMAL 602) for VTEP 181. In response, host-A 110A may identify restore the first mapping to (VM1 131, VTEP1 181) assuming that the teaming policy has not changed and no new VTEP is added or removed. This has the effect of migrating VM1 131 from VTEP2 182 to VTEP1 181. In practice, blocks 410-460 may be repeated as required as VTEP 181/182 alternates between HEALTHY and UNHEALTHY. See also 550 and 580 in FIG. 5.

In practice, whenever mapping information is updated, host-A 110A may generate and send a notification to management entity 103/104, such as to alert a network administrator using a user interface provided by SDN manager 103 on the management plane. The user interface may also display VTEP state information and support administrative operations to transition to/from ADMIN_DOWN 670 state. In practice, the user interface may be a graphical user interface (GUI), command line interface (CLI), application programming interface (API), etc.

Overlay Networking

Figure 7:
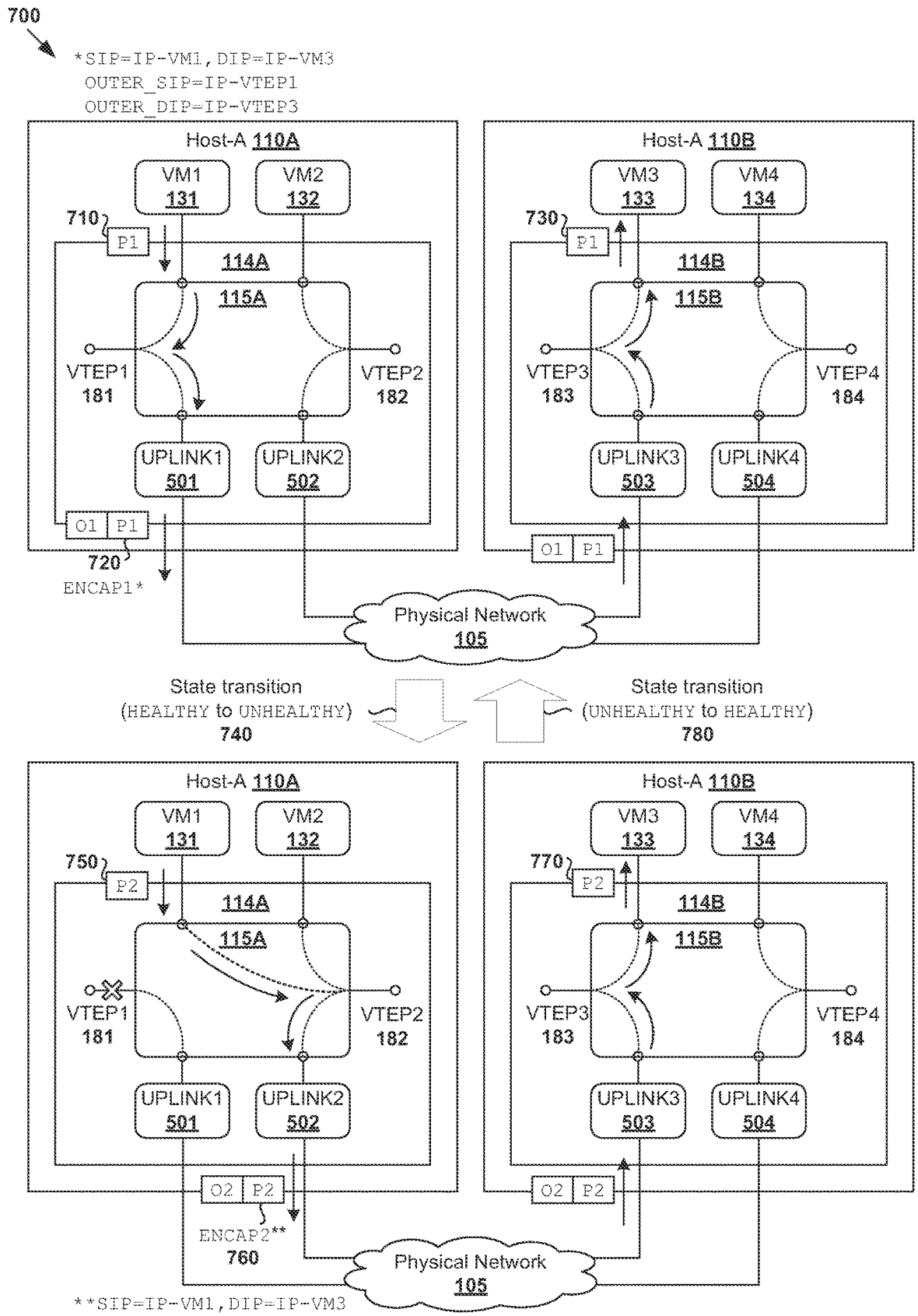
FIG. 7 is a schematic diagram illustrating an example overlay traffic forwarding based on the mapping information in FIG. 5.

FIG. 7 is a schematic diagram illustrating example 700 of overlay traffic forwarding based on the mapping information in FIG. 5. Any suitable tunneling protocol or encapsulation mechanism may be used for overlay networking, such as VXLAN, GENEVE, GRE, etc. The encapsulation mechanisms are generally connectionless. Using GENENE as an example, various implementation details may be found in a draft document entitled "GENEVE: Generic Network Virtualization Encapsulation" (draft-ietf-nvo3-geneve-16) published by Internet Engineering Task Force (IETF). The document is incorporated herein by reference.

At 710 and 720 in FIG. 7, in response to detecting a first egress packet (P1) from VM1 131 to VM3 133, a first encapsulated packet (O1, P1) may be generated based on mapping information=(VM1 131, VTEP1 181). In this case, VTEP1 181 is associated with state=HEALTHY (e.g., NORMAL). The egress packet (P1) may specify (SIP=IP-VM1, DIP=IP-VM3) associated with respective source VM1 131 on host-A 110A and destination VM3 133 on host-B 110B. The first encapsulated packet may include the egress packet (P1) and an outer header (O1) specifying specify (OUTER_SIP=IP-VTEP1, OUTER_DIP=IP-VTEP2) associated with respective source VTEP1 181 on host-A 110A and destination VTEP3 183 on host-B 110B.

At 730 in FIG. 7, in response to receiving the first encapsulated packet, destination VTEP3 183 may perform decapsulation and forward the inner packet (P1) to VM3 133. Based on mapping information=(VM1 131, VTEP1 181), any return traffic from VM3 133 to VM1 131 may be sent from VTEP3 183 on host-B 110B to VTEP1 181 on host-A 110A. Note that the source and destination VMs may be associated with the same VNI, or different VNIs. Using the example in FIG. 2, VM1 131 and VM3 133 may be in different VNIs and connected via logical switches (e.g., LS1 201 and LS2 202) and a logical router (e.g., DR 205).

At 740 in FIG. 7, in response to detecting a state transition associated with VTEP1 181 from HEALTHY to UNHEALTHY, host-A 110A may update the mapping information to (VM1 131, VTEP2 182). Again, this has the effect of migrating VM1 131 from VTEP1 181 in the UNHEALTHY state (e.g., IP_WAITING, BFD_DOWN or ADMIN_DOWN) to VTEP2 182 in the HEALTHY state (e.g., NORMAL).

At 750 and 760 in FIG. 7, in response to detecting a second egress packet (P2) from VM1 131 to VM3 133, a second encapsulated packet (O2, P2) may be generated based on updated mapping information=(VM1 131, VTEP2 182). The second encapsulated packet may be generated by encapsulating the egress packet (P2) with an outer header (O2) specifying specify (OUTER_SIP=IP-VTEP2, OUTER_DIP=IP-VTEP2) associated with respective source VTEP2 182 on host-A 110A and destination VTEP3 183 on host-B 110B.

At 770 in FIG. 7, in response to receiving the second encapsulated packet, destination VTEP3 183 may perform decapsulation and forward the inner packet (P2) to VM3 133. Based on updated mapping information=(VM1 131, VTEP2 182) learned from the second encapsulated packet and/or received from SDN controller 104, any return traffic from VM3 133 to VM1 131 may be sent from VTEP3 183 on host-B 110B to VTEP2 182 on host-A 110A.

Similar to the example in FIG. 5, the mapping information may be updated dynamically based on the state of VTEP 181/182. This reduces the likelihood of the connectivity loss for VM(s) mapped to particular VTEP1 181 based on a teaming policy. Instead of maintaining the mapping statically, the VM(s) may be migrated to facilitate high availability of overlay networking. This reduces system downtime and improves VM performance. Based on the above examples, automatic remapping of VMs to HEALTHY VTEPs may be performed to support high availability of overlay networking to improve VM performance and user experience.

Load Balancing

Figure 8:
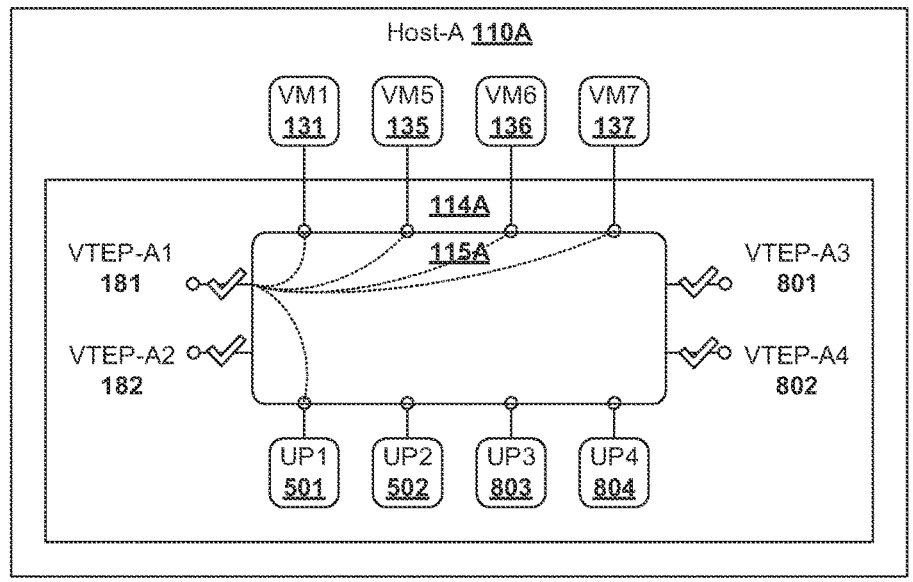
FIG. 8 is a schematic diagram illustrating a second example of VTEP mapping for overlay networking.
Figure 8:
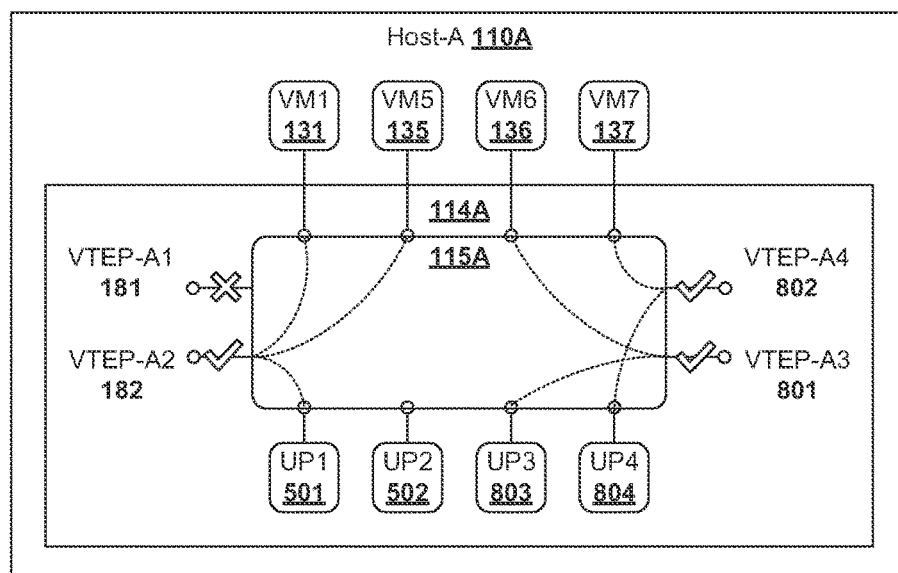

FIG. 8 is a schematic diagram illustrating second example 800 of VTEP mapping for overlay networking. In this example, multiple VMs may be migrated from a source VTEP to respective multiple destination VTEPs for load balancing purposes. For example, host-A 110A may be configured with N=4 VTEPs for overlay networking, particularly VTEP-A1 181, VTEP-A2 182, VTEP-A3 801 and VTEP-A4 802.

At 810-840 in FIG. 8, host-A 110A may generate mapping information that associates multiple VMs (i.e., VM1 131, VM5 135, VM6 136 and VM7 137) with VTEP-A1 181. Here, all VTEPs 181-182, 801-802 are in state=HEALTHY and mapped to respective uplinks 501-502, 803-804.

At 850 in FIG. 8, host-A 110A may detect a state transition associated with VTEP-A1 181 from HEALTHY to UNHEALTHY (e.g., BFD_DOWN 604 in FIG. 6). In response, host-A 110A may update the mapping information to migrate VMs 131, 135-137 from VTEP-A1 181. For example, VM1 131 may be migrated to VTEP-A2 182 (see 860), VM5 135 also to VTEP-A2 182 (see 870), VM6 136 to VTEP-A3 801 (see 880), and VM7 137 to VTEP-A4 802 (see 890). This way, overlay traffic from these VMs may continue to flow while a network administrator fixes issues affecting VTEP-A1 181.

In practice, the destination VTEP for each VM may be selected at random, and/or using a teaming policy. For example, VTEP selection may be performed to achieve load balancing based on a configuration parameter (e.g., VNIC-PortID or MACAddr) associated with VM 131/135/136/137. Since there are N−1=3 VTEPs in state=HEALTHY for overlay networking, the following modulo operation may be performed to select VTEP-A2 182, VTEP-A3 801 or VTEP-A4 802: endpointID=(VNICPortID or MACAddr)% (N−1).

In another example, the VTEP selection may be load-based, such as based on the number of VMs that are already mapped to VTEP-A2 182, VTEP-A3 801 or VTEP-A4 802. This way, multiple (M=4) VMs requiring migration may be distributed among N−1=3 VTEPs that are operating in state=HEALTHY to reduce the risk of overloading a particular VTEP. Another example may involve tracking a performance metric (e.g., packet rate) on the uplinks and selecting a VTEP associated with a particular uplink with the least usage.

At 895 in FIG. 8, when faulty VTEP-A1 181 is fixed and transitions into state=HEALTHY again, host-A 110A may restore the initial mappings by migrating VMs 131, 135-137 back to VTEP-A1 181. Based on the above, examples of the present disclosure facilitate high-availability overlay networking to reduce downtime in SDN environment 100.

Container Implementation

Although explained using VMs, it should be understood that public cloud environment 100 may include other virtual workloads, such as containers, etc. As used herein, the term "container" (also known as "container instance") is used generally to describe an application that is encapsulated with all its dependencies (e.g., binaries, libraries, etc.). In the examples in FIG. 1 to FIG. 8, container technologies may be used to run various containers inside respective VMs 131-134. Containers are "OS-less", meaning that they do not include any OS that could weigh 10s of Gigabytes (GB). This makes containers more lightweight, portable, efficient, and suitable for delivery into an isolated OS environment. Running containers inside a VM (known as "containers-on-virtual-machine" approach) not only leverages the benefits of container technologies but also that of virtualization technologies. The containers may be executed as isolated processes inside respective VMs.

Computer System

The above examples can be implemented by hardware (including hardware logic circuitry), software or firmware or a combination thereof. The above examples may be implemented by any suitable computing device, computer system, etc. The computer system may include processor(s), memory unit(s) and physical NIC(s) that may communicate with each other via a communication bus, etc. The computer system may include a non-transitory computer-readable medium having stored thereon instructions or program code that, when executed by the processor, cause the processor to perform process(es) described herein with reference to FIG. 1 to FIG. 8.

The techniques introduced above can be implemented in special-purpose hardwired circuitry, in software and/or firmware in conjunction with programmable circuitry, or in a combination thereof. Special-purpose hardwired circuitry may be in the form of, for example, one or more application-specific integrated circuits (ASICs), programmable logic devices (PLDs), field-programmable gate arrays (FPGAs), and others. The term 'processor' is to be interpreted broadly to include a processing unit, ASIC, logic unit, or programmable gate array etc.

The foregoing detailed description has set forth various embodiments of the devices and/or processes via the use of block diagrams, flowcharts, and/or examples. Insofar as such block diagrams, flowcharts, and/or examples contain one or more functions and/or operations, it will be understood by those within the art that each function and/or operation within such block diagrams, flowcharts, or examples can be implemented, individually and/or collectively, by a wide range of hardware, software, firmware, or any combination thereof.

Those skilled in the art will recognize that some aspects of the embodiments disclosed herein, in whole or in part, can be equivalently implemented in integrated circuits, as one or more computer programs running on one or more computers (e.g., as one or more programs running on one or more computing systems), as one or more programs running on one or more processors (e.g., as one or more programs running on one or more microprocessors), as firmware, or as virtually any combination thereof, and that designing the circuitry and/or writing the code for the software and or firmware would be well within the skill of one of skill in the art in light of this disclosure.

Software and/or to implement the techniques introduced here may be stored on a non-transitory computer-readable storage medium and may be executed by one or more general-purpose or special-purpose programmable microprocessors. A "computer-readable storage medium", as the term is used herein, includes any mechanism that provides (i.e., stores and/or transmits) information in a form accessible by a machine (e.g., a computer, network device, personal digital assistant (PDA), mobile device, manufacturing tool, any device with a set of one or more processors, etc.). A computer-readable storage medium may include recordable/non recordable media (e.g., read-only memory (ROM), random access memory (RAM), magnetic disk or optical storage media, flash memory devices, etc.).

The drawings are only illustrations of an example, wherein the units or procedure shown in the drawings are not necessarily essential for implementing the present disclosure. Those skilled in the art will understand that the units in the device in the examples can be arranged in the device in the examples as described, or can be alternatively located in one or more devices different from that in the examples. The units in the examples described can be combined into one module or further divided into a plurality of sub-units.

We claim:

1. A method comprising:
   executing, by a computer system, a hypervisor that supports a virtualized computing instance;
   implementing, by the hypervisor, a logical overlay network comprising a virtual switch implemented by the hypervisor and having multiple ports, the virtual switch comprising a forwarding table with entries that implement at least a portion of a logical switch in the logical overlay network, each of the ports of the virtual switch corresponding to a respective virtual network interface card (VNIC) implemented by the virtualized computing instance;
   monitoring, in the logical overlay network, multiple virtual tunnel endpoints (VTEP) that are configured in the hypervisor for overlay networking, wherein the multiple VTEPs include a first VTEP and a second VTEP;
   in response to detecting a state transition associated with the first VTEP from a healthy state to an unhealthy state, identifying mapping information that associates the virtualized computing instance the first VTEP; and
   updating the mapping information to associate the virtualized computing instance with the second VTEP and migrating the virtualized computing instance from the first VTEP in the unhealthy state to the second VTEP in the healthy state; and
   in response to detecting an egress packet from the virtualized computing instance to a destination, generating and sending an encapsulated packet towards the destination based on the updated mapping information, wherein the encapsulated packet includes the egress packet and an outer header identifying the second VTEP to be a source VTEP.

2. The method of claim 1, wherein the method further comprises:
detecting a subsequent state transition associated with the first VTEP from the unhealthy state to the healthy state; and
updating the mapping information to reassociate the virtualized computing instance with the first VTEP, thereby migrating the virtualized computing instance from the second VTEP to the first VTEP.

3. The method of claim 1, wherein detecting the state transition comprises at least one of the following:
detecting the state transition to a first unhealthy state in which (a) the first VTEP has not been assigned with a valid Internet Protocol (IP) address or (b) a lease associated with the IP address has expired;
detecting the state transition to a second unhealthy state in which each and every overlay networking path via the first VTEP is down; and
detecting the state transition to a third unhealthy state that is configured by a network administrator.

4. The method of claim 1, wherein detecting the state transition comprises:
determining that the first VTEP remains in the unhealthy state after a timeout period has elapsed.

5. The method of claim 1, wherein the method further comprises:
generating and sending a report to a management entity to cause the management entity to propagate the updated mapping information to multiple destination VTEPs.

6. The method of claim 1, wherein identifying the mapping information comprises:
identifying the mapping information that is configured based on one of the following teaming policies:
(a) load balancing among the multiple VTEPs based on a configuration parameter associated with the virtualized computing instance and (b) a failover order associated with the multiple VTEPs.

7. The method of claim 1, wherein the method further comprises:
in response to detecting the state transition, selecting the second VTEP for the virtualized computing instance based on one of the following:
a configuration parameter associated with the virtualized computing instance and number of virtualized computing instances mapped to the second VTEP.

8. A non-transitory computer-readable storage medium that includes a set of instructions which, in response to execution by a processor of a computer system, cause the processor to perform operations comprising:
executing, by a computer system, a hypervisor that supports a virtualized computing instance;
implementing, by the hypervisor, a logical overlay network comprising a virtual switch implemented by the hypervisor and having multiple ports, the virtual switch comprising a forwarding table with entries that implement at least a portion of a logical switch in the logical overlay network, each of the ports of the virtual switch corresponding to a respective virtual network interface card (VNIC) implemented by the virtualized computing instance;
monitoring, in the logical overlay network, multiple virtual tunnel endpoints (VTEP) that are configured in the hypervisor for overlay networking, wherein the multiple VTEPs include a first VTEP and a second VTEP;
in response to detecting a state transition associated with the first VTEP from a healthy state to an unhealthy state, identifying mapping information that associates the virtualized computing instance the first VTEP; and
updating the mapping information to associate the virtualized computing instance with the second VTEP and migrating the virtualized computing instance from the first VTEP in the unhealthy state to the second VTEP in the healthy state; and
in response to detecting an egress packet from the virtualized computing instance to a destination, generating and sending an encapsulated packet towards the destination based on the updated mapping information, wherein the encapsulated packet includes the egress packet and an outer header identifying the second VTEP to be a source VTEP.

9. The non-transitory computer-readable storage medium of claim 8, wherein the operations further comprise:
detecting a subsequent state transition associated with the first VTEP from the unhealthy state to the healthy state; and
updating the mapping information to reassociate the virtualized computing instance with the t first VTEP thereby migrating the virtualized computing instance from the second VTEP to the first VTEP.

10. The non-transitory computer-readable storage medium of claim 8, wherein detecting the state transition comprises at least one of the following:
detecting the state transition to a first unhealthy state in which (a) the first VTEP has not been assigned with a valid Internet Protocol (IP) address or (b) a lease associated with the IP address has expired;
detecting the state transition to a second unhealthy state in which each and every overlay networking path via the first VTEP is down; and
detecting the state transition to a third unhealthy state that is configured by a network administrator.

11. The non-transitory computer-readable storage medium of claim 8, wherein detecting the state transition comprises:
determining that the first VTEP remains in the unhealthy state after a timeout period has elapsed.

12. The non-transitory computer-readable storage medium of claim 8, wherein the operations further comprise:
generating and sending a report to a management entity to cause the management entity to propagate the updated mapping information to multiple destination VTEPs.

13. The non-transitory computer-readable storage medium of claim 8, wherein identifying the mapping information comprises:
identifying the mapping information that is configured based on one of the following teaming policies:
(a) load balancing among the multiple VTEPs based on a configuration parameter associated with the virtualized computing instance and (b) a failover order associated with the multiple VTEPs.

14. The non-transitory computer-readable storage medium of claim 8, wherein the operations further comprise:
in response to detecting the state transition, selecting the second VTEP for the virtualized computing instance based on one of the following:
a configuration parameter associated with the virtualized computing instance and number of virtualized computing instances mapped to the second VTEP.

15. A computer system, comprising:

one or more processors; and a non-transitory computer-readable storage medium that includes a set of instructions which, in response to execution by the one or more processors to cause a computer system to perform operations comprising:

executing, by a computer system, a hypervisor that supports a virtualized computing instance;

implementing, by the hypervisor, a logical overlay network comprising a virtual switch implemented by the hypervisor and having multiple ports, the virtual switch comprising a forwarding table with entries that implement at least a portion of a logical switch in the logical overlay network, each of the ports of the virtual switch corresponding to a respective virtual network interface card (VNIC) implemented by the virtualized computing instance;

monitoring, in the logical overlay network, multiple virtual tunnel endpoints (VTEP) that are configured in the hypervisor for overlay networking, wherein the multiple VTEPs include a first VTEP and a second VTEP;

in response to detecting a state transition associated with the first VTEP from a healthy state to an unhealthy state, identifying mapping information that associates the virtualized computing instance the first VTEP; and updating the mapping information to associate the virtualized computing instance with the second VTEP and migrating the virtualized computing instance from the first VTEP in the unhealthy state to the second VTEP in the healthy state; and in response to detecting an egress packet from the virtualized computing instance to a destination, generating and sending an encapsulated packet towards the destination based on the updated mapping information, wherein the encapsulated packet includes the egress packet and an outer header identifying the second VTEP to be a source VTEP.

16. The computer system of claim 15, wherein the operations further comprise:

detecting a subsequent state transition associated with the first VTEP from the unhealthy state to the healthy state; and updating the mapping information to reassociate the virtualized computing instance with the first VTEP, thereby migrating the virtualized computing instance from the second VTEP to the first VTEP.

17. The computer system of claim 15, wherein detecting the state transition comprises at least one of the following:

detecting the state transition to a first unhealthy state in which (a) the first VTEP has not been assigned with a valid Internet Protocol (IP) address or (b) a lease associated with the IP address has expired;

detecting the state transition to a second unhealthy state in which each and every overlay networking path via the first VTEP is down; and detecting the state transition to a third unhealthy state that is configured by a network administrator.

18. The computer system of claim 15, wherein detecting the state transition comprises:

determining that the first VTEP remains in the unhealthy state after a timeout period has elapsed.

19. The computer system of claim 15, wherein the operations further comprise:

generating and sending a report to a management entity to cause the management entity to propagate the updated mapping information to multiple destination VTEPs.

20. The computer system of claim 15, wherein identifying the mapping information comprises:

identifying the mapping information that is configured based on one of the following teaming policies:

(a) load balancing among the multiple VTEPs based on a configuration parameter associated with the virtualized computing instance and (b) a failover order associated with the multiple VTEPs.

21. The computer system of claim 15, wherein the operations further comprise:

in response to detecting the state transition, selecting the second VTEP for the virtualized computing instance based on one of the following:

a configuration parameter associated with the virtualized computing instance and number of virtualized computing instances mapped to the second VTEP.

* * * * *